United States Patent [19]
Evans et al.

[11] Patent Number: 5,513,248
[45] Date of Patent: Apr. 30, 1996

[54] CORDLESS TELEPHONE MICRO-CELLULAR SYSTEM

[75] Inventors: James G. Evans, Colts Neck; Diane Z. Lehder, Rumson; Gregory Panagopoulos, Keasbey, all of N.J.

[73] Assignee: AT&T Corp., Murray Hill, N.J.

[21] Appl. No.: 258,353

[22] Filed: Jun. 10, 1994

Related U.S. Application Data

[63] Continuation of Ser. No. 801,331, Dec. 2, 1991, abandoned.

[51] Int. Cl.$^6$ ................................................ H04Q 7/20
[52] U.S. Cl. ............................. 379/61; 379/58; 379/64
[58] Field of Search ............................ 379/58, 59, 60, 379/61, 62, 63, 64; 455/33.1, 33.2, 54.1, 56.1; 370/110.4

[56] References Cited

U.S. PATENT DOCUMENTS

| | | | |
|---|---|---|---|
| 4,456,793 | 6/1984 | Baker et al. | |
| 4,596,042 | 6/1986 | Stangl | 455/56.1 |
| 4,682,351 | 7/1987 | Makino | 379/62 |
| 4,700,374 | 10/1987 | Bini | 379/60 |
| 4,807,225 | 2/1989 | Fitch | 370/71 |
| 4,827,499 | 5/1989 | Warty et al. | 379/63 |
| 4,965,849 | 10/1990 | Kunihiro | 455/34 |
| 4,974,256 | 11/1990 | Cyr et al. | 379/59 |
| 4,975,939 | 12/1990 | Sasaki | 379/60 |
| 5,014,295 | 5/1991 | Kunihiro | 379/61 |
| 5,181,200 | 1/1993 | Harrison | 455/33.2 |
| 5,195,127 | 3/1993 | Ichikawa et al. | 379/58 |

FOREIGN PATENT DOCUMENTS

| | | | |
|---|---|---|---|
| 0175537 | 7/1988 | Japan | 379/62 |
| 0223835 | 9/1989 | Japan | 379/62 |
| 0040611 | 2/1991 | Japan | 455/33.2 |
| 0191623 | 8/1991 | Japan | 455/33.2 |

OTHER PUBLICATIONS

IEEE Communications Magazine, "The Cellular Environment of Lightweight Handheld Portables", Jul. 1989, pp. 20–29.

"NTT Business Cordless Telephone", Akio Sasaki, et al, *NTT Review*, vol.1, No. 1, May 1989.

*Primary Examiner*—Dwayne D. Bost
*Attorney, Agent, or Firm*—Samuel R. Williamson

[57] ABSTRACT

A cordless telephone system is arranged for extending the operating range of a cordless telephone portable unit within such system. The cordless telephone system comprises a plurality of cordless telephone stations that plug into any available wall telephone jack and may share the intrapremises telephone wire-pair with one or more existing corded telephone stations without interference. Each cordless telephone station consists of a cordless telephone base unit and its associated cordless telephone portable unit. Although each of the portable units is associated with a particular base unit, all of the portable units are able to operate with any of the base units in the system. As a user of a portable unit with a call in progress roams about a premises, all base units monitor the quality of the radio frequency signal received from the portable unit. If the signal quality of a base unit actively communicating with the portable unit deteriorates to below an acceptable level, control apparatus in the system identifies another base unit and executes a hand-off of the communication link with the portable unit to this base unit that is then receiving the signal from the handset unit with an acceptable signal quality. Operational control for the base units is provided through a time division multiple access arrangement wherein a communications channel is imposed on the existing premises telephone wire-pair above the audio frequency band used for standard telephone service.

30 Claims, 5 Drawing Sheets

FIG. 4
TELEPHONE CIRCUIT 400

CORDLESS TELEPHONE MICRO-CELLULAR SYSTEM

This application is a continuation of application Ser. No. 07/801,331, filed on Dec. 2, 1991, now abandoned.

BACKGROUND OF THE INVENTION

1. Technical Field

This invention relates to cordless telephone systems and more particularly to arrangements which extend the operating range of a portable unit within a cordless telephone system.

2. Description of the Prior Art

Cordless telephones in the United States presently operate on ten separate frequency pairs (channels) in the 46/49 MHz band. These telephones have generally been used in the residential market to allow a user to make and receive telephone calls with a portable handset unit connected by a radio link to a fixed base unit. Because of radiated power limitations on the radio link, however, the handset unit must be used within a radius of a few hundred feet of the base unit. The actual range of operation in any given situation depends on the radio propagation characteristics of a particular premises, which are affected by the building material composition as well as the contents of the building. Generally, the operating range limitation has not been considered a shortcoming for the cordless telephones that have been heretofore used in residential premises, but now that cordless telephones are being provided for use in business premises and also as the primary telephone in some residential premises, this operating range limitation is considered a much more critical problem.

In order to cope with the limited operating range of the cordless telephone system, one multiple channel access system employs a centrally located controller and transceivers located at dispersed cell sites for communicating with the portable handset units. This system also uses a common signaling channel to set up calls. Operation of the system is such that the handset unit bids for access to the plurality of radio frequency channels. Access to channels is provided by a centralized controller through a transceiver at a cell site. Since cordless telephones have been allocated a limited number of communication channels over which they may operate, this system has the disadvantage of reducing the available number of channels by minimally committing one of these as the common signaling channel. This system also has the disadvantage of requiring manual location registration wherein the user of the portable handset unit must remember to register the location of his or her handset unit, else the centralized controller will not know the whereabouts of this portable handset unit. One alternative to manual location registration is the suggestion of periodic polling of each portable handset unit through the transceivers at the cell sites. This is also undesirable, however, in that it may cause needless interference to users of other nearby cordless telephone systems.

In addressing the problems of limited available radio frequency spectrum and the resulting interference between transceivers operating at the same frequencies, one cordless telephone system employs a line-of-sight or optical transmission link for communications between portable handset units and dispersed base units. This system, described in U.S. Pat. No. 4,456,793, specifically utilizes modulated infrared transmissions between the portable handset units and each of the dispersed base units. Although this system generally avoids the problems associated with having limited available radio frequency spectrum, it has the disadvantage of having a limited operating range between base and handset units because of its line-of-sight operating requirement. It unfortunately thus requires a large number of base units dispersed through a premises in order to obtain the desired continuous coverage for a user of a handset unit as he or she roams through the premises.

SUMMARY OF THE INVENTION

In accordance with the invention, a cordless telephone system provides an extended operating range for a portable or handset unit within the system. The cordless telephone system comprises a plurality of handset units and a plurality of base units for communicating over a plurality of communication channels with each one of the handset units. The base units are dispersed so as to divide a location of the telephone system into a number of reception areas for telephone service with the handset units.

In accordance with an aspect of the invention, the operational control for the plurality of base units is provided through a time division multiple access arrangement wherein control signals provided between the base units are imposed on the existing intrapremises telephone wire-pair above the audio frequency band used for standard telephone service. By providing these control signals for the base units on the intrapremises telephone wire-pair, the requirement for additional intrapremises wiring is avoided. Thus the cordless telephone system advantageously may be installed by any person. And the area coverage of the system may be increased simply by a person's installing an additional cordless telephone station in a location where this additional coverage is desired. Although each of the handset units in the system generally is associated with a particular base unit, all of the handset units are able to operate with any of the base units in the system.

In accordance with a feature of the invention, at least one of the plurality of base units provides operational control over the plurality of base units for switching the telephone service for a handset unit in use from one to another of the plurality of base units.

In accordance with a further feature of the invention, multiple handset units may be off-hook in the cordless telephone system at the same time. Since each base unit stores in its internal memory the assigned channel for each other base unit/handset unit combination and since these base units are configured to scan the channels assigned these other base units, any base unit can respond to a service request signal from any handset unit configured for operation in the system.

BRIEF DESCRIPTION OF THE DRAWING

This invention and its mode of operation will be more clearly understood from the following detailed description when read with the appended drawing in which.

Throughout the drawings, an element when shown in more than one figure is designated by the same reference numeral in each such figure.

DETAILED DESCRIPTION

The subject cordless telephone system is a "user friendly" enhancement to a residence or business communication system advantageously arranged for extending the operating range of a cordless telephone portable unit within such system. The cordless telephone system comprises a plurality of cordless telephone stations that plug into any available wall telephone jack and can share the intrapremises telephone wire-pair with one or more existing corded telephone stations without interference. Each cordless telephone station consists of a cordless telephone base unit and its associated cordless telephone portable or handset unit with the base unit requiring power from a standard 115 volt source. Operational control for the plurality of base stations is provided through a time division multiple access (TDMA) arrangement wherein a channel is imposed on the existing premises telephone wire-pair above the audio frequency band (below 4 KHz) used for standard telephone service.

A rudimentary cordless telephone system having two cordless telephone stations enhances existing telephone service by providing two more telephone stations that can access the existing telephone line plus add an intercom channel for internal communications between the base and handset units of the newly added stations. Of greater significance, however, is the extended operating range afforded each portable unit associated with each one of the cordless telephone base units within such a system. Heretofore, individual cordless telephone base units, although they shared the same telephone wire-pair, have not been permitted to control the operation of any cordless telephone handset unit other than its own associated telephone handset unit without requiring additional wiring for routing control signals between the base units or designating a control channel for communicating these control signals between the base units. By putting these control signals on the intrapremises telephone wire-pair, the user friendly cordless telephone system may be readily installed by any person. And the area coverage of the system may be increased simply by a person's installing an additional cordless telephone station in a location where this additional coverage is desired. Although each of the portable units in the system is associated with a particular base unit, all of the portable units are able to operate with any of the base units in the system.

Figure 1:
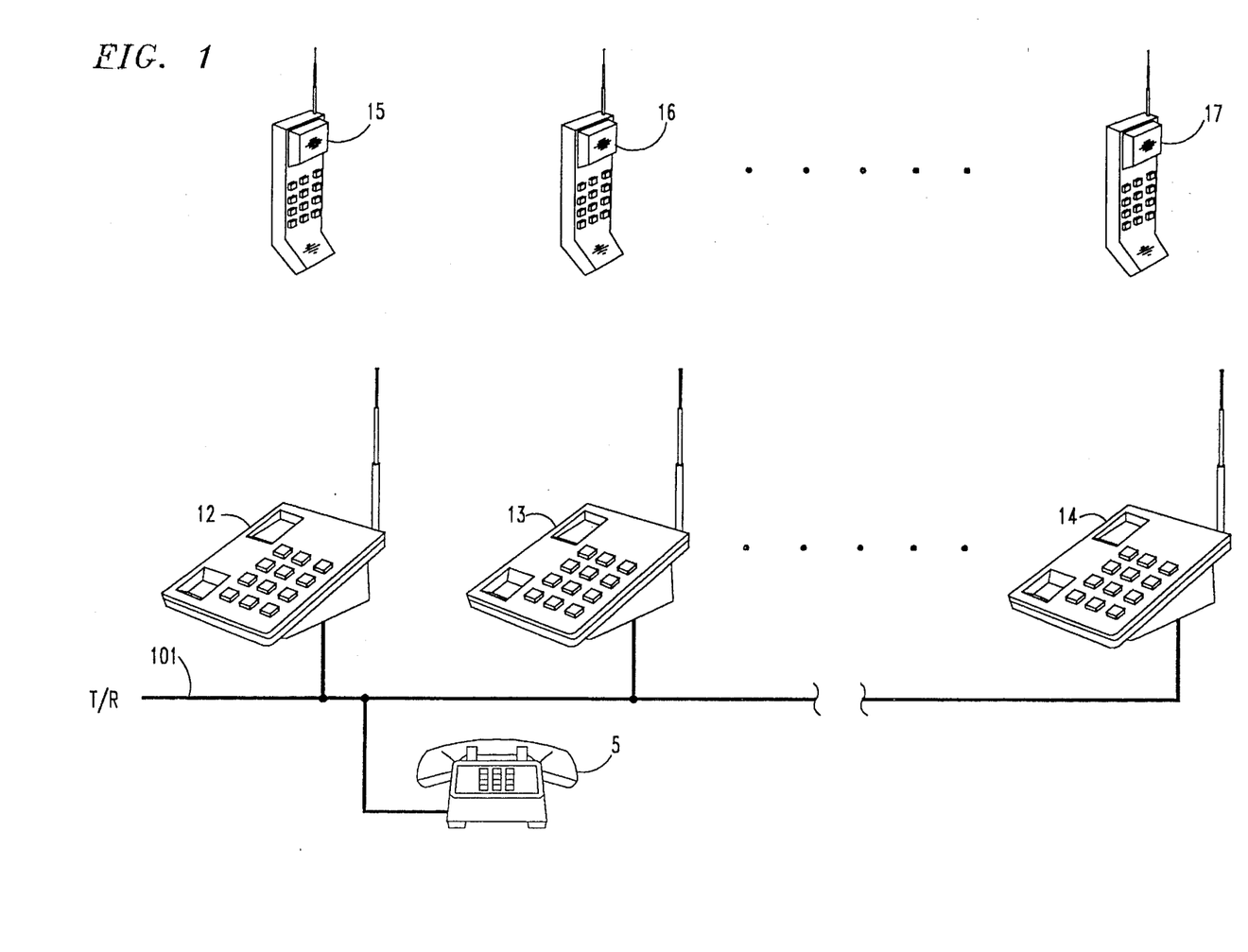
FIG. 1 is a block diagram of a cordless telephone system illustrating both multiple cordless base units and handset units in the system, the cordless telephone base units all being commonly connected to a tip/ring line in accordance with the invention.

FIG. 1 provides a broad view of the cordless telephone system after installation, for example, at a business or residential premises. The system is shown accommodating three cordless telephone stations comprising a plurality of fixed cordless telephone base units 12 through 14 and their respectively associated plurality of portable handset units 15 through 17. Although only three cordless stations are shown, it is to be understood that the system may accommodate additional stations as desired by a user. The cordless base units employed in the system are connected to a telephone wire-pair such as tip/ring line 101. A corded telephone station 5 is also connected to this tip/ring line 101 which connects all of these stations to a telephone line switching system (not shown) such as a central office.

Prior to the installation of the cordless telephone system, it is typical to find only a corded telephone station such as station 5 connected to the tip/ring line 101 at a business or residential premises. In accordance with the present invention, cordless telephone base units 12 through 14 are customer installable units that bridge onto the existing tip/ring line 101 for providing both voice communications onto this line and also control signals for distributing telephone control information among these base units.

In a first embodiment of the invention, base unit 12 is configured as a controlling or master base unit and all other base units in the system are configured as satellite base units. The satellite base units include base units 13 and 14 and any other similarly configurable base units that are subsequently added to this system. The first base unit that the user purchases is the base unit 12 which is configured at the time of manufacture as a master base unit. Installation of the base unit 12 is achieved simply by plugging this unit into a standard 115 volt source and also to any available telephone jack at the premises. Also the handset unit 15, which operates on battery power, is cradled in an accommodating cradle on the base unit 12. When this base unit 12 and its associated handset unit 15 are installed, the base unit 12 randomly chooses a common identification (ID) code for it and handset unit 15 in accordance with, for example, the teachings of U.S. Pat. No. 4,736,404 issued to R. E. Anglikowski, et al. on Apr. 5, 1988. This ID code is registered in an internal table which can accommodate multiple ID codes.

In accordance with the invention, communications between the master base unit 12 and the satellite base units 13 and 14 are, as earlier indicated, provided by a TDMA arrangement. In this implementation and with reference to FIG. 2, there is shown a reference or start pulse provided by master base unit 12 in a slot 201 and, illustratively, three communication time slots 202, 203 and 204 containing data provided onto the tip/ring line 101 respectively by master base unit 12 and satellite base units 13 and 14.

Figure 2:
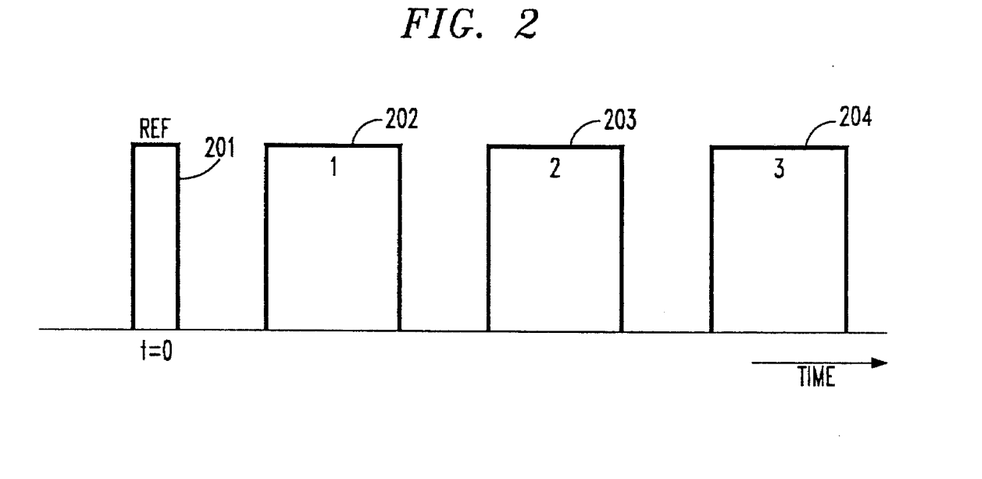
FIG. 2 depicts a time division multiple access arrangement wherein the base units in the system communicate with each other, in accordance with the invention.

For initial configuring of the cordless telephone system, by way of a brief example, after the master base unit is plugged into a standard 115 volt source, this unit transmits the start pulse in slot 201 for providing a synchronizing signal for the satellite base units in the system and then its identifying data to these satellite base units in communication slot 202. This identifying data includes its ID code, the frequency channel upon which it operates, an identifying code for any other stations it identifies as being in the system and the communication slots occupied by these stations. It also includes in this communication slot 202 calling data which seeks a response from any unknown satellite stations also present on the tip/ring line 101. When satellite base unit 13 first responds, for example, a communication slot such as slot 203 is established by master base unit 12 for use by satellite base unit 13 for all subsequent communications from this satellite base unit 13 to the master base unit 12. In order to avoid collision between the satellite base units 13 and 14, (and any other satellite base units in the system) which could result if they both attempted to respond at the same time, each satellite base generates a "pseudo-random" number from between 0 and 10. This number is then used in determining a delay time for responding such that message collisions between the satellite base units are avoided. The need for a random transmission time arises from message collision considerations when two base units transmit at the same time, both calculating idle time from the same event.

When the base unit 13 is installed, this base unit randomly chooses an ID code in the manner previously described herein for the master base unit 12. It then sends its ID code in the communication slot 203 reserved for it to the master base unit 12. The base unit 13 also begins to build its own internal table for identifying other base units in the system. It receives and stores the information provided in communication slot 202 from master base unit 12 as to the ID code and the channel of operation of this base unit. During ongoing communications, the base unit 13 also sends an acknowledge (ACK) signal when it receives updated information from the master base unit.

Once satellite base unit 13 begins its response to master base unit 12, its signal on the tip/ring line 101 is detected by base unit 14 and any other base unit then on this line. Since satellite base unit 13 will have gained access to the telephone tip/ring line 101, base unit 14 and any other base units will then wait until base unit 13 completes its response and then attempt to respond to the master base unit 12 within the time designated for the next communication slot, in this instance communication slot 204, and with a delay time within this slot determined by the generation of a pseudo-random number. Once base unit 14 responds to the master base unit 12, it is then assigned this communication slot 204 for subsequent communications to the master base unit 12. The master base unit 12 always delays for a predetermined time period between the reception of the last known communication slot and the transmission of its reference or start pulse 201 in order to allow additional base units that are subsequently added to the cordless telephone system to transmit a response to the master base unit 12 in response to receipt of calling data from this master base unit.

Once satellite base unit 14 is installed, it will begin to receive data from the master base unit 12 in the communication slot 202 and send its data to the master base unit in the communication slot 204 in the manner previously described earlier herein for satellite base unit 13. It will be provided with and register the ID codes and assigned frequency channels of the other base units 12 and 13 in the system in its internal table, as well as have its ID code and assigned frequency channel registered by these base units in their respective internal tables. Although handset units 15 through 17 share a common ID code with their respectively associated base units 12 through 14, operation of these handset units are such that they are able to obtain telephone service from any of the available base units in the system.

The master base unit 12 coordinates the overall operation of the cordless telephone system including the handing-off of roaming handset units between available base units. Through the communications provided by each one of the satellite base units with the master base unit over the tip/ring line 101, the status of one or more roaming handset units is provided to the master base unit. Specifically, each satellite base unit shares information with the master base unit as to the signal strength of a signal received by it from any one or more handset units in the system then in use, as described in greater detail later herein.

If a satellite base unit is unplugged from the system, the master base unit 12 senses the absence of the ACK from this base unit in its designated communication slot. This removes the unplugged base unit from the system. Since information about the handset unit then associated with that base unit has been registered by the other base units, this does not remove the handset unit from the handset ID code tables. As long as the handset unit continues to function, that is, responds to incoming ring signals or is used for generating a service request by a user, it will be able to communicate within the cordless telephone system.

The handset unit may be cradled in any one of the base units in the system. If a handset unit is cradled for recharging of its battery, which has not completely discharged, the base unit in which it is cradled reads the ID code present in this handset unit. If it is an ID code then recognized by the system, the base unit changes this ID code and, through the master base unit, informs the other satellite base units including the base unit normally associated with this handset unit of its changing of the ID code. The base unit normally associated with this handset unit then adopts this new ID code as its own.

When a battery in a handset unit is replaced or has been totally discharged and then the handset unit cradled, the base unit in which the handset unit is cradled will not recognize the ID code then in the handset unit. This base unit then generates a new ID code for this handset unit and, in the manner indicated above, provides it to all of the other base units. The base unit also assigns to this handset unit a frequency channel not then being used in the system. As a result of this operation, all of the base units will have an ID code in their internal tables for a handset unit no longer operating in the system. The inactive handset unit having this ID code will be detected and tagged for eventual dropping from the system during a process executed by the system for alerting the handset units of incoming calls. This process, described in greater detail later herein and with reference to FIG. 5, identifies each operating handset unit and assigns each unreachable handset unit an out-of-service condition status.

Information between the base unit 12 and the base units 13 and 14 is communicated in three ways in accordance with the protocol employed in this system. First, the base unit 12 transmits command messages to the satellite base units 13 and 14 in communication time slot 202. No specific response message other than an ACK is required by the master base unit from the satellite base units. Second, the master base unit 12 queries a satellite base unit for information and a response message is expected from the satellite base unit in its assigned communication time slot. Lastly, a satellite base unit transmits an unprompted message in its assigned communication time slot to the master base unit 12 and a response message may or may not be expected. These messages are exchanged during the time, typically once every 25 milliseconds, when the master base unit 12 polls each satellite base unit for determining its status in the system.

In operation by way of a brief example, if handset unit 16 is communicating with satellite base unit 13 and the user of this handset unit wanders out of the operating range of this base unit into the operating range of satellite base unit 14 which is then on-hook (not communicating with another handset unit), handset unit 16 will be handed off from base unit 13 to the satellite base unit 14. In this hand-off, the radio link between base unit 13 and handset unit 16 will be terminated and a new radio link between the base unit 14 and handset unit 16 will be established. Like handset unit 16, the other handset units 15 and 17 may be handed off to any other idle base unit in the system. The only requirement is that this other base unit not be actively communicating with another handset unit.

Multiple handset units may be off-hook at the same time. Each handset unit must be within the reception range of an idle base unit, however. Since each base unit has in its internal table the assigned channel for each other base unit and since these base units are configured to scan the channels assigned these other base units, any base unit can respond to a request-for-service signal from any handset unit configured for operation in the system. If, for example, a first handset unit has established a communications link with a first base unit in the system and a second handset unit goes off-hook and generates a request-for-service signal, if this second handset unit is within the reception range of a second base unit not then engaged by another handset unit on a communications link, then this second handset unit will establish an communication link with this idle base unit. Thus a person involved in a conversation with a distant party using the first handset unit in the system may have a second party join in the conversation on a second handset unit in the system without channel conflict or interference.

When an incoming call is received, a broadcast ring indication signal is generated by each base unit such that each base unit's associated handset unit is signaled at the same time. The broadcast ring indication signal is based on a universal ID code randomly generated by the master base unit 12 and passed along to the satellite base units in the communication time slot 202 for storage in and use by all of the base units. Thus each cordless telephone handset within the reception range of its assigned base unit is able to quickly and simultaneously respond to an incoming call, as explained in greater detail later herein.

A similar broadcast ring indication signal may be generated by the handset units in response to an intercommunications request by any handset unit. A user of a handset unit wishing to page a person he or she believes to be within the audible range of another handset unit may generate a broadcast ring signal from the handset unit he or she is then using to, for example, have the person being paged join in an ongoing telephone conversation.

Figure 3:
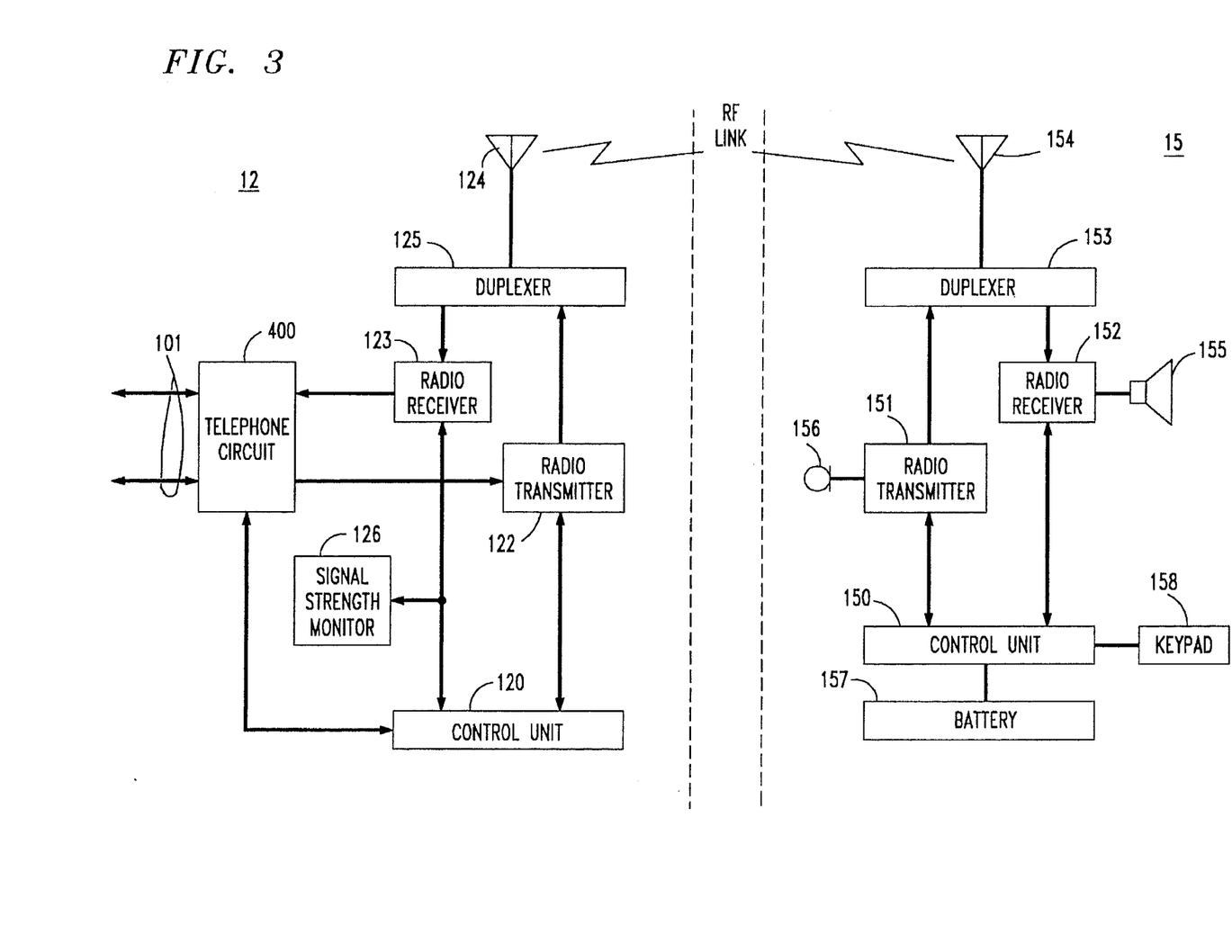
FIG. 3 is block representation of the major functional components of one of the base units and one of the handset units depicted in FIG. 1, operative in accordance with the invention.

Referring next to FIG. 3, there is shown a block representation of the major functional components of the base unit 12 and the handset unit 15, both depicted in FIG. 1 and operative in an extended range cordless telephone system in accordance with the principles of the invention. With regard to the functional components illustratively described in base unit 12, the satellite base units of FIG. 1 incorporate these same components. Similarly, the handset units 16 and 17 incorporate the same components as handset unit 15 and are operationally identical.

Included in the base unit 12 is a control unit 120 which advantageously provides a number of control functions. In coordinating the overall operation of the cordless telephone system, this control unit 120 is required to receive and maintain certain information from the control units in the satellite base units and, in return, provide some portions of this information back to the control units in the satellite base units for updating their operating conditions.

As each satellite base unit in the system is initialized, the control unit 120 requests that the control units in the satellite base units 13 and 14 provide data indicative of their respectively selected frequency channels and ID codes. Upon receipt of this information, the control unit 120 in master base unit 12 completes its internal table with this information. Next, the control unit 120 transmits this information for the table entries of the satellite base units to these base units for informing them of the other channels they are to periodically monitor and the ID codes they are to recognize. These satellite base units then complete their internal tables with this information.

The control unit 120 also interfaces with a control unit 150 in the handset unit 15 and, while the handset unit 15 is located in a mating cradle in the base unit 12, generates and transfers ID code data to the control unit 150, as indicated earlier herein, for example, in accordance with the teachings of U.S. Pat. No. 4,736,404 issued to R. E. Anglikowski, et al. This ID code is transferred to random access memory (RAM) (not shown) in an internal table in the control unit 120 along with the ID code from any other base unit and handset unit combination then operating in the system.

In response to a communications attempt by a handset unit, this control unit 120 compares the received ID code data from the handset unit with stored ID code data representative of those ID codes then contained in the handset units operating in the system. A favorable comparison of the data from the received ID code and at least one of the stored ID codes must be achieved in order for the base unit 12 to respond to a request-for-service signal from a handset unit. This control unit 120 also randomly generates a code for the broadcast ring indication signal for use by base unit 12 and the satellite base units in contacting the handset units operating in the system. This code may be regenerated and/or retransmitted to the satellite base units as is necessary by the master base unit 12.

When base unit 12 is actively communicating with a handset unit, the control unit 120 also receives and processes opcode data provided by the handset unit over the communications link then existing between these two units for dialing and providing other signaling information over the tip/ring line 101. Control unit 120 may be implemented through the use of a microcomputer containing ROM, RAM and through use of the proper coding. Such a microcomputer is known in the art and is readily available from semiconductor manufacturers such as Signetics, Intel and AMD.

Both the base unit 12 and the handset unit 15 are operable on a plurality of communication channels. The control unit 120 configures a radio transmitter 122 and a radio receiver 123 in the base unit 12 for proper operation on the selected one of the plurality of channels when actively communicating with a handset unit such as the handset unit 15. The control unit 120 also provides the appropriate channel control information to the control unit in the handset unit such as control unit 150 in handset unit 15.

When communicating with a handset unit, the transmit and receive signals of the base unit 12 are coupled to a duplexer 125 which permits the transmitter 122 and the receiver 123 to both simultaneously operate over antenna 124 while preventing the output of transmitter 122 from being coupled directly to the input of the receiver 123. Although a duplexer circuit has been included in the base unit (and also the handset unit), it should be understood that such duplexer is purely illustrative and that in a time division duplexing arrangement, in which this invention is also applicable, a duplexer is not necessary. When the base unit is in an idle state awaiting an incoming telephone call or a request-for-service signal from a handset unit, transmitter 122 is turned off while receiver 123 remains on to detect the request-for-service signal. A signal strength monitor circuit 126 is connected to receiver 123 for monitoring the strength of a signal received from a handset unit while that handset unit is communicating with one of the base units in the system. The operation of this circuit is described in greater detail later herein. The telephone circuit 400 serves as an interface for control signals provided over the tip/ring line 101 between the control unit 120 of base unit 12 and the control units respectively associated with base units 13 and 14. The telephone circuit 400 also serves as the interface for voice signals over the tip/ring line 101 which are sent to transmitter 122 and received from receiver 123.

Referring next to the handset unit 15, there is shown the control unit 150 which stores the ID code data that is generated by a base unit and provided to this handset unit each time it is cradled in a base unit. This ID code data stored in control unit 150 is transmitted from the handset unit 15 to the base units while establishing initial communications through a request-for-service signal as well as during the transfer of subsequent opcode data to an active base unit with which a two-way radio frequency communications link has been established. These signals can be transmitted, for example, in a frequency shift keying (FSK) format and includes a synchronizing signal immediately followed by a data field which includes the ID code generated by a base control unit such as control unit 120. Like the control unit 120, this control unit 150 may be implemented through the use of a microcomputer containing ROM, RAM and through use of the proper coding. Such a microcomputer is known in the art and is readily available from semiconductor manufacturers such as Signetics, Intel and AMD.

Communications with the base units in the system are provided via a radio transmitter 151 and a radio receiver 152 in the handset unit 15. The output of the transmitter 151 and input for the receiver 152 are commonly coupled through a duplexer 153 to an antenna 154. The receiver 152 demodulates voice signals transmitted by the active base unit and couples these signals to an acoustical device such as, for example, loudspeaker 155. The transmitter 151 has as its input speech signals from a microphone 156, ID code data from control unit 150 and opcode data representative of entries on a keypad 158, all of which it transmits to the base unit 12. The keypad 158 is used for entering dial digits and control functions executable by the control unit 150 or for transmission to the active base unit. A battery 157 is also included in the handset unit 15 for providing operating power for all circuitry in this unit.

In order to conserve battery power, a controlled power up/power down mode of operation for the handset unit 15 is implemented in accordance with the teachings of U.S. Pat. No. 4,731,814 issued to W. R. Becker et al. on Mar. 15, 1988. The battery 157 in the handset unit is normally charged while the handset unit is placed in a cradle located in, for example, its associated base unit. When the handset unit is removed from this base unit and is in an idle or standby state awaiting a telephone call, power to the control unit 150, receiver 152 and certain other selected circuitry in the handset unit 15 is controlled to minimize power consumption. Power to other non-essential circuit in the handset unit 15 is turned completely off during this state. The handset unit automatically turns on to a full operating mode from the controlled power up/power down mode in response to events such as a user depressing a key on the keypad 158 or the receipt of a broadcast ring indication from a base unit, this ring indication being indicative of an incoming call detected on the tip/ring line 101.

Figure 4:
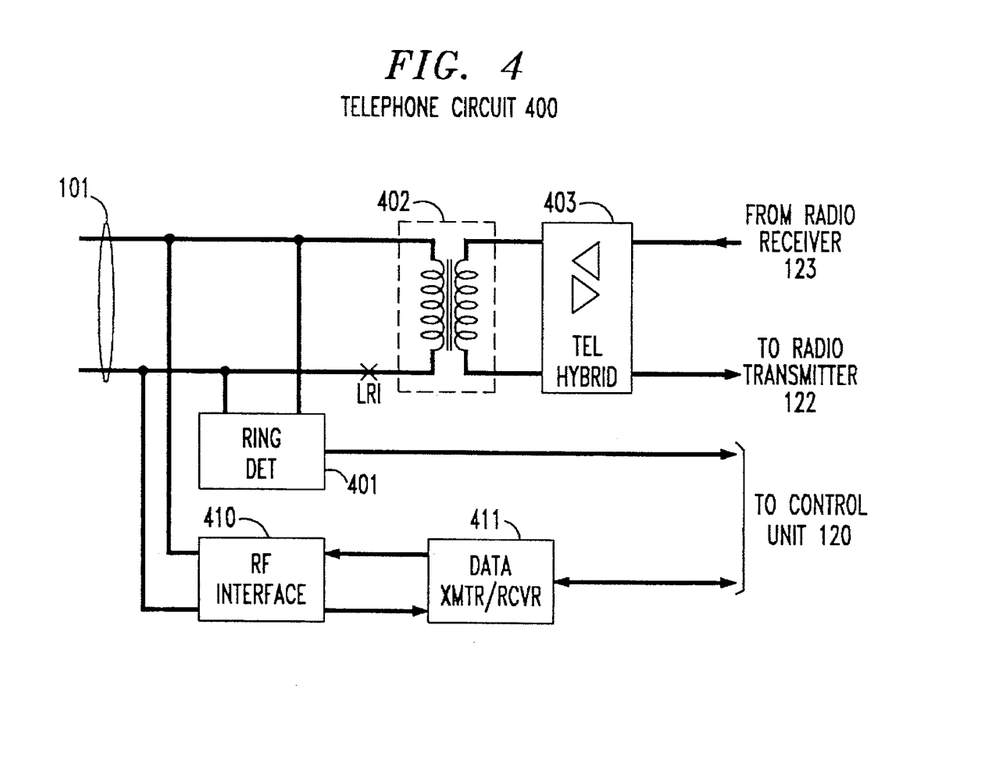
FIG. 4 is shows an enhanced block representation of the telephone circuit 400 shown in FIG. 3 in accordance with the invention.

Referring now to FIG. 4, there is shown an enhanced block diagram of the telephone circuit 400 shown in FIG. 3. This circuit includes a ring detector 401, a coupling transformer 402 and a telephone hybrid 403. The coupling transformer 402 and the telephone hybrid 403 deliver incoming speech from the tip/ring line 101 to the radio transmitter 122 and receive outgoing speech and audio signals from the radio receiver 123 onto the tip/ring line 101.

The ring detect circuit 401 is responsive to incoming ringing signals and supplies an indication of these signals to the control unit 120. Telephone ringing detector circuits are well known and typically comprise a pair of series connected avalanche diodes whose anodes (or cathodes) are tied together. These diodes are in series with a capacitor to block DC current flow. Current flow in the series path is detected by an opto-isolator circuit whose output is electrically remote from high voltage line signals. An example of a commercially available ringing detector circuit is the TCM 1501. Activation of relay contact LR1 completes a DC path on one side of the tip/ring line-pair such as is required for answering an incoming call.

The telephone circuit 400 also includes an RF interface 410 and a data transmitter/receiver 411 for coupling data in the form of control information from the control unit 120 onto the tip/ring line 101 and for coupling data from the tip/ring line 101 to the control unit 120.

The RF interface 410 of the telephone circuit includes circuitry for performing the function of a hybrid circuit at radio frequencies in that it isolates transmit and receive signals which are respectively coupled to and from the tip/ring line 101. Other circuits provided in this interface include impedance matching circuits which provide, for example, 600 ohms to the tip/ring line 101 at the RF frequency of interest. An interface suitable for use as RF interface 410 may be constructed in accordance with the teachings of U.S. Pat. No. 4,807,225 which issued to R. C. Fitch on Feb. 2, 1987.

The data transmitter/receiver 411 transmits and receives signals in a FSK format with a carrier frequency of, for example, 455 KHz. An oscillator such as the LM 567 along with minimal other circuitry may be used in this data transmitter/receiver 411 as a modulating circuit to generate the carrier frequency of 455 KHz which is then frequency shifted by the binary data coupled from the control unit 120. Similarly, the FSK signal received from the tip/ring line 101 may be demodulated by this same circuitry and the demodulated binary data provided to the control unit 120. Modulation and demodulation techniques suitable for use herein are described in *Transmission Systems for Communications* by Members of the Technical Staff of Bell Laboratories, (Western Electric Company, Incorporated, 1971). Data transmitters/receivers also are available in the art. A data transmitter/receiver suitable for use as the data transmitter/receiver 411 may be constructed in accordance with the teachings of U.S. Pat. No. 4,807,225 which issued to R. C. Fitch.

Figure 5:
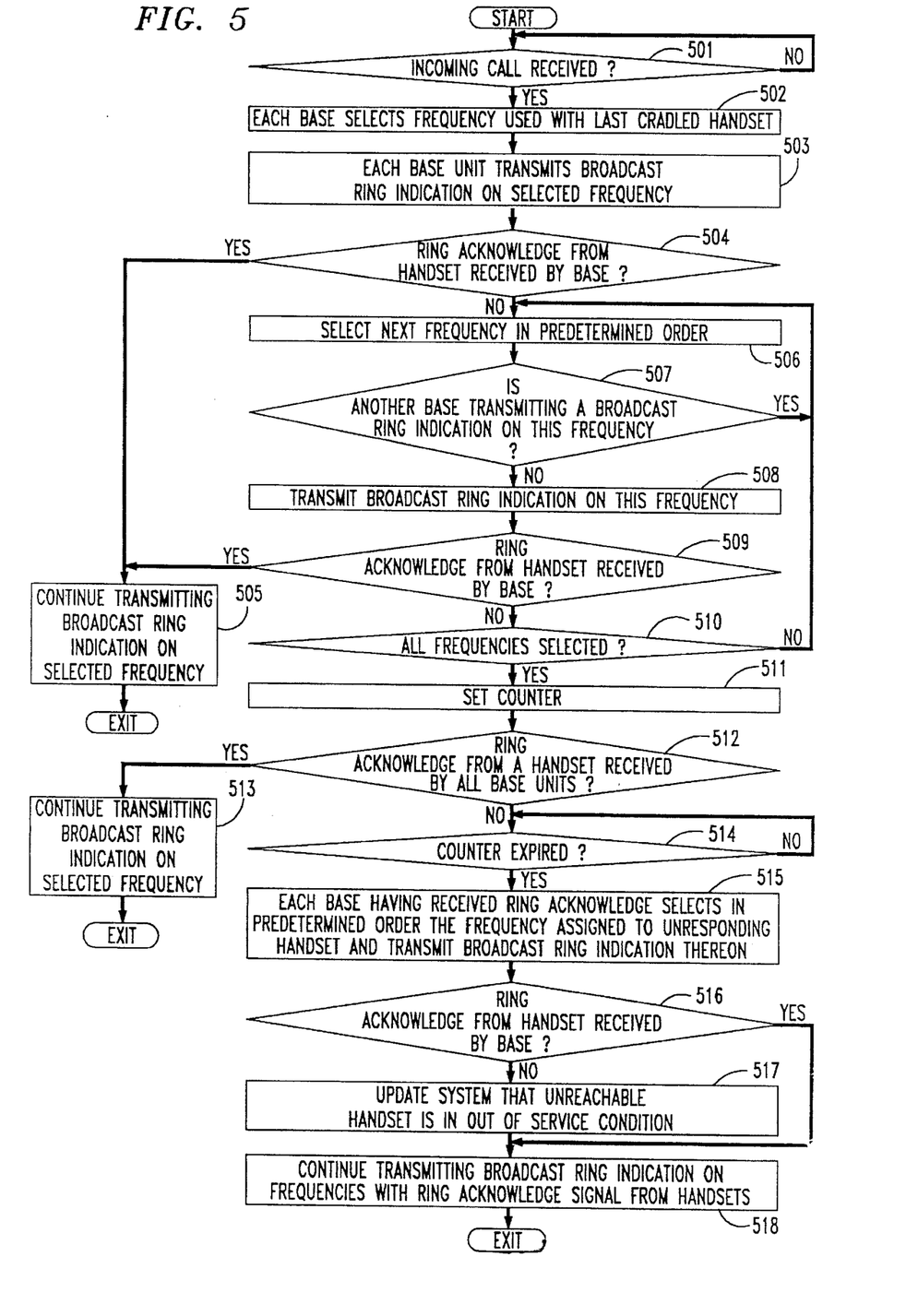
FIG. 5 is a flow diagram of a process suitable for incorporating into the cordless telephone system of FIG. 1 operative in activating each handset unit when an incoming call is received by the system in accordance with the invention.

With reference to FIG. 5, there is shown a flow chart illustrating the operation of the cordless telephone system in providing a ring indication to each cordless telephone handset for responding to an incoming telephone call.

The process is entered at decision 501 where it is determined if an incoming call is received. If not, the process returns to the start position. If an incoming call has been received, the process advances to step 502 where each base unit in the system selects from its internal table the frequency of the channel used with its assigned handset unit. The process next advances to the step 503 where each base unit transmits its broadcast ring indication on the frequency selected in step 502. The process next advances to decision 504 where it is determined if a ring acknowledge from a handset unit is received by the base unit transmitting the broadcast ring indication. If so, each base unit may be presumed to have reached its assigned handset unit and each base unit with this status continues to transmit the broadcast ring indication on its selected frequency channel as indicated in step 505 until one of the handset units go off-hook or the incoming call is terminated.

If in decision 504 a ring acknowledge is not received by one or more base units, with regard to these base units, the process advances to step 506. In this step 506, each of the base units not receiving a ring acknowledge looks to its internal table and selects the next frequency channel assigned in an order predetermined by the controlling or master base unit. The order of frequency channel selection is sequenced by the master base unit. Thus, for example, if none of the base units were able to locate its assigned handset unit, base unit 12 would attempt to locate handset unit 16 on the frequency channel assigned to base unit 13 while at the same time base unit 13 will attempt to locate the handset unit 17 on the frequency channel assigned to base unit 14. Also simultaneously base unit 14 would attempt to locate handset unit 15 on the frequency assigned to base unit 12. This sequencing of the frequency channels selected by the base units continue until every assigned frequency channel has been selected by each base unit and the broadcast ring indication transmitted on each channel in use in the system by each base unit.

From the step 506, the process next advances to decision 507 where it is determined if another base unit is transmitting a broadcast ring indication on this frequency channel selected in step 506. This is determined by listening for a ring acknowledge signal being transmitted on this frequency channel by a contacted handset unit responding to another base unit. If a base unit has been successful in contacting a handset unit on this frequency channel, the process returns to step 506 where the next frequency channel in the predetermined order is selected. If a base unit has not been successful in contacting a handset unit on this frequency channel, however, the process advances to step 508 where each base unit not having contacted a handset unit transmits on its next selected frequency channel.

The process next advances to decision 509 where it is determined if a ring acknowledge from a handset unit is received by each base unit transmitting the broadcast ring indication on these selected frequency channels. If so, the process advances to step 505 and each base unit receiving a ring acknowledge signal continues to transmit a broadcast ring indication on the frequency channel then selected. If in decision 509, a ring acknowledge is not received by the base units then attempting to reach a handset unit, the process advances to decision 510 where a determination is made as to whether all frequency channels in each base unit's internal table have been selected. If all of these frequency channels have not been selected, the 5process returns to step 506 where yet another frequency channel is selected and the broadcast ring indication transmitted on this frequency channel if another base unit is not already transmitting on this frequency channel. If all frequency channels have been selected, however, the process advances to step 511 where a counter, which provides a predetermined delay, is set. From this step, the process advances to a decision 512 where it is determined if a ring acknowledge signal from each handset unit has been received by some base unit. If so, the base units continue transmitting broadcast ring indication on the selected frequency channels as indicated in step 513 until one of the handsets goes off-hook or the incoming call is terminated.

If in decision 512, a ring acknowledge from a handset unit is not received by all base units, the process advances to decision 514 where it is determined if the counter set in step 511 has expired. Once this counter has expired, the process advances to step 515 where each base unit having received a ring acknowledge signal from a handset unit is sequenced in predetermined order to select the frequency channel assigned to the unresponding handset unit or units and to transmit its broadcast ring indication on this or these frequency channel. Each base unit already transmitting a ring indication is thus sequenced to momentarily interrupts its transmission to the handset unit it is then transmitting to and transmits a ring indication on the frequency channel on which the unreachable handset is then assigned. From the step 515, the process advances to the decision 516 where it is determined if a ring acknowledge signal from the yet unreachable handset unit is received by either of the base units that transmitted to it on its assigned frequency channel.

If a ring acknowledge signal is not received by a base unit in decision 516, the process advances to step 517 where the system is updated to reflect that the unreachable handset (or handsets) is in an out-of-service condition. This out-of-service condition could be due to the user of the handset unit taking the handset unit beyond its operating range or that the battery in the handset unit is discharged. Each internal table in the base units is updated to reflect that a handset unit supposedly operating in the system is unreachable. The number of times a handset remains unreachable by the system is logged by the system for eventual removal of the data reflective of that handset unit from the respective memory tables in the base units in the system. If while one handset unit remains unreachable, another handset unit appears in the internal tables as a result of its being cradled in one of the base units in the system, then the base unit that had the unreachable handset unit as its associated handset unit will adopt this new handset unit with the new ID code as its associated handset unit. After a predetermined number of attempts, typically 15, at contacting the unreachable handset unit (each separate execution of the process for providing a ring indication constituting an attempt), the information stored on this handset unit in the internal tables of the base units in the system is dropped from these tables. An alternative way to remove the information stored in the internal tables of the base units is to make removal of this data time dependent. Thus after a handset unit remains unreachable for 10 days, for example, the information then in the internal tables of the base units is dropped from these tables.

If a ring acknowledge signal from the one or more unreachable handset units is received by at least one of the base units in decision 5 16, the process advances to step 518 where the base units continue transmitting a broadcast ring signal indication on those frequency channels with a ring acknowledge signal from handset units. This is achieved by the base units alternating among the selected frequency channels in transmitting broadcast ring indication on these selected frequency channels until either a handset unit goes off-hook or the incoming call is terminated. Although the period is adjustable, the cordless telephone system is arranged to have each base unit attempt to reach each handset unit typically within two seconds after an incoming call is received.

Channel cycling is employed by both the master and satellite base units to assure that all handset unit service requests are received when a handset unit is beyond the operating range of its assigned base unit. In the operation of channel cycling, each satellite base unit is informed by the master base unit of the frequency channels being used by each handset unit. The master base unit and the satellite base units then listen for service requests on each one of the channels assigned to a handset unit operating within the cordless telephone system. Each one of the base units cycle through each of the channels, dwelling for a short period, typically 0.5 seconds, on each channel in order to receive any service requests from a handset unit then using that channel. The channel cycling operation is executed by each idle base unit until either a task of greater priority is presented by the control unit 120 in master base unit 12 or it receives a service request from a handset unit.

In order for an idle handset unit to request service from a base unit (e.g., to originate a call or change channels), the handset unit must be within the operating range of a base unit and the base unit must be on the same channel as the handset unit or move to the channel in time to respond to this request. The control unit 120 in base unit 12 not only informs the satellite base units of the channels currently being used by all the handset units, but also when a handset unit is changed from one operating channel to another. If a user executes a channel change operation on the handset unit he or she is then using, this information is passed via the active base unit back to the control unit 120 in base unit 12, which informs the control units in the other base units of the change. Thus, if the handset unit is communicating with its assigned base unit when the user changes channels, the other base units are informed of the change and which new channel to periodically cycle to and monitor in order to receive a service request from that handset unit. Similarly, if the handset unit is communicating with other than its assigned base unit when the user changes channels, the other base units are informed of the handset unit's changing channels and which new channel to also periodically cycle to and monitor (one channel for each handset unit operating in the system). The assigned base unit also is informed of the new channel which it must monitor while in the idle condition for subsequent communications with this handset unit, such as providing to it the initial broadcast ring indication. The active base unit through which the handset unit was then communicating, when it returns to the idle condition, also returns to monitoring the channel commonly assigned to it and its associated handset unit.

When a satellite base unit receives a service request from a handset unit, the satellite base unit informs the master base unit 12 of the request. The master base unit 12 then grants permission to the satellite base unit to establish a radio link with the requesting handset unit. If more than one satellite base unit receives the service request, the master base unit 12 analyzes the received responses according to a process described later herein and with reference to FIG. 6. In this process, the master base unit 12 grants permission to the first base unit responding to the signal which has the highest quality signal of the responding base units. Thus, the master base unit 12 grants permission to the first satellite base unit that receives the signal from the handset unit with the highest radio link quality and inform the other base units to ignore the service request. The master base unit also is capable of responding to a service request from any of the handset units. Thus if the master base unit 12 receives a service request and has the highest radio link quality, it will directly respond to the signal and inform the satellite base units to ignore the service request.

The control unit 120 in master base unit 12 insures that no two handset units will occupy the same frequency channel at the same time. A user of a handset unit may select a channel for operation that is different from the one selected by each cordless telephone station during initialization, for example. Because the control unit 120 in master base unit 12 continually communicates with the control units in the satellite base units, it is able to control the channels selected by all of the satellite base units for use by their associated handset units. The master base unit 12 therefore prevents the selection of a frequency channel by a satellite base unit that has been previously selected and presently assigned by another base unit for use by its handset unit. Thus, if a user initiates a channel change, the base unit with which the handset unit is then communicating will only change (and cause the handset to follow) to a channel not in use by or previously selected and presently occupied by any other handset unit.

The control unit 120 in base unit 12 also informs the satellite base units of the ID codes that they are allowed to select and assign to a handset unit. In order to avoid the selection of the same ID code by more that one base unit, the control unit 120 monitors the ID codes selected by the master base and its satellite base units in the same manner in which it monitors the frequency channels selected by the handset units. Thus if a satellite base unit happens to select an ID code that is then being used by the master base unit and its handset unit combination or another satellite base unit and handset unit combination, the control unit 120 instructs the satellite base unit then selecting an ID code to select another one. The base units are thus controlled such that no two base units will be able to have the same ID code at the same time. Thus, when a user returns his handset unit to a base unit, this base unit will be allowed to only select an ID code that is not then being used by any other base unit and handset unit combination in the system.

Figure 6:
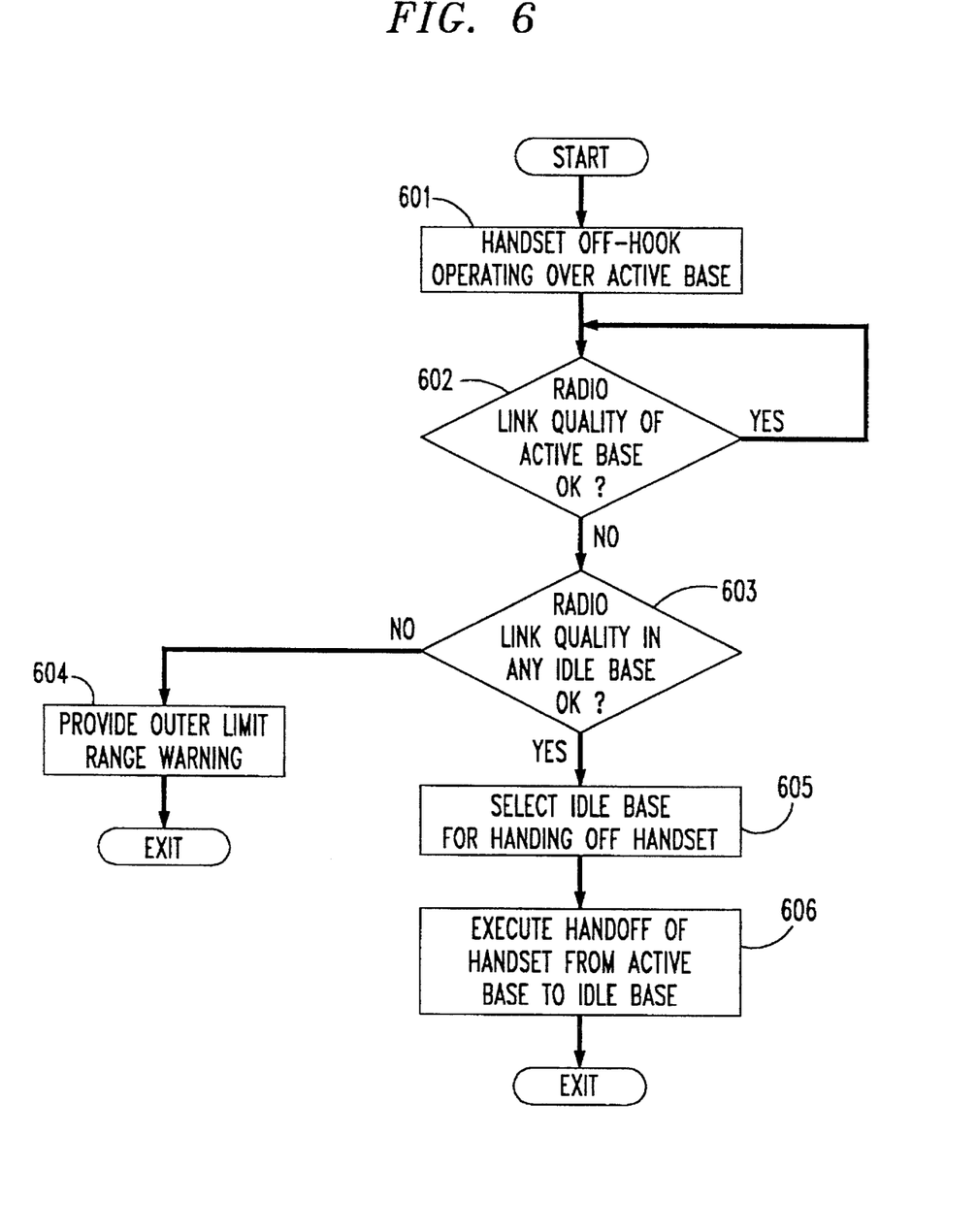
FIG. 6 is a flow diagram of a process suitable for incorporating into the cordless telephone system of FIG. 1 operative in handing-off each handset unit from an active base unit to an idle base unit, in accordance with the invention, when the radio link quality of the active base unit deteriorates to below an acceptable level.

With reference to FIG. 6, there is shown a flow chart illustrating the operation of the cordless telephone system in selecting an idle base unit and handing-off telephone communications with a handset unit to the idle base unit from an active base unit when the radio link quality of the active base unit deteriorates to below an acceptable level. The process is entered at step 601 where a handset unit is in an off-hook condition operating over an established radio link with an active base unit.

In order to achieve continuous coverage throughout the desired area in a premises, the signal strength monitoring circuitry in the active base unit and in each idle base unit, monitors the strength or radio link quality of the received signal from the handset unit while this handset unit communicates with the active base unit. Although the signal strength monitoring circuitry is provided in the base unit, it is understood that such monitoring also may be performed with similar circuitry includable in each handset unit.

Each idle shared base unit in the cordless telephone system reports to control unit 120 in the master base unit 12, shown in FIG. 3, its own radio link quality of the radio link existing during communications between a handset unit and another base unit. The control unit 120 then stores and continually updates this information in temporary memory. In this manner, the control unit in the master base unit accumulates data reflective of radio link quality from all of the idle base units. As a user of a handset unit approaches the edge of the coverage area of an active base unit, the control unit 120 already has available the information it needs to execute a hand-off to the appropriate base unit.

When the received signal strength in the active base unit deteriorates to below an acceptable level as determined by decision 602, the control unit in this base unit determines that its radio link quality is POOR and then communicates this information to the control unit 120 in master base unit 12. If the radio link quality is acceptable in any idle base unit as determined by decision 603, the control unit 120, in turn, selects in step 605 the appropriate idle or new base unit for handing off the handset unit thereto and establishing communications therewith. The hand-off of step 606 is accomplished as follows: the control units in the old and the new base units mute the voice paths in these units, the new base unit is then instructed by its control unit to turn on its transmitter, and the control unit of the old base unit is instructed to turn off its transmitter, and then both base units unmute their voice paths. From step 606 the process is exited.

In the execution of the hand-off process, more specifically, each of the base units detect radio link quality through use of the signal strength monitor circuit 126 shown in FIG. 3 which may be, for example, a received signal strength indicator (RSSI) circuit. The RSSI circuit produces an output voltage that is proportional to the strength of the received signal from the handset unit. The base unit then compares this voltage relative to both a predetermined upper and a lower threshold level. An output above the higher threshold level indicates a GOOD link, an output between the two threshold levels indicates a TOLERABLE link, and an output below the lower threshold level indicates a POOR link. If a POOR link exists between the active handset unit and the base unit, the control unit 120 first attempts to hand-off the handset unit to a base unit with a GOOD link. If no idle base unit is found with a GOOD link, the control unit 120 immediately executes a hand-off of the handset unit to the first base unit found with a TOLERABLE link. If no base unit was found with a TOLERABLE link, the control unit 120 does not permit the base unit with the established communications link to hand-off the handset unit. Rather, the control unit in the active base unit is configured for optionally causing the handset unit to generate an audible and/or distinctive tone which is recognizable to the user that he or she is then approaching the outer limit of the operating range for that handset unit in the cordless telephone system, as shown in step 604.

Various modifications of this invention are contemplated and may obviously be resorted to by those skilled in the art. In a second embodiment of the invention, for example, the cordless telephone system depicted in FIG. 1 is configured such that any one of the multiple cordless telephone base units shown therein may serve as the controlling base unit for the system. In this embodiment, a single cordless telephone base unit placed in the system periodically sends out a signal on the tip/ring line requesting a response from another configurable base unit. Upon receiving none, this single base unit functions as a normal base unit, i.e., receives telephone calls over the tip/ring line and routes speech and other audio signals between the tip/ring line and the handset unit in a conventional manner, for a cordless telephone. This base unit also changes the D code it shares with the handset unit each time the handset unit is cradled in the base unit.

When additional cordless telephone stations are added to the system, the single or first base unit recognizes and reconfigures itself to communicate with the additional base units of these respective stations. As the base units associated with the added stations are connected to the tip/ring line, either of these base units including the previously connected base unit, may become the controlling base unit and, through a TDMA arrangement provided over the tip/ring line, cause initialization between any other configurable base units connected to the tip/ring line.

In accordance with a randomization process, determined by a routine in each base unit, a header signal, such as illustrated by start pulse 201, is generated just before sending its identifying data in a communications slot, such as slot 201. Any other base unit on the system will detect this header from the first base unit and not attempt to send its own header in this time slot. Thus when two or more base units are activated at the same time, the randomization process, which randomizes the time that each will transmit its header signal, avoids collision between these base units as they attempt to transmit a start pulse.

The base unit seizing or gaining control of the telephone tip/ring line sends out over this line its identifying data or information as to how it is currently configured after the start pulse. This identifying data includes the frequency channel it has assigned to itself and its associated handset unit for communications and also the ID code that this base unit commonly shares with its associated handset unit. This identifying data is recorded in each of the configurable base units then attached to the tip/ring line.

After the first base unit has completed transmitting its identifying data, it then monitors the tip/ring line to receive any identifying data subsequently presented by any other base units located in the system. These remaining base units also have to seize the line before transmitting their identifying data. Once the first base unit has completed its transmission of data in a communication time slot such as time slot 202, each of the remaining base units wait until the time period for the next designated communication time slot, i.e., slot 203, and for a randomly determined delay time period within this time slot, before attempting to transmit its identifying data. The first one of the base units on the line to complete these two waiting periods without heating a signal from another base unit transmits its own identifying data in the same manner as the first base unit. These other base units still waiting to seize the line will wait until this base unit has completed the transmission of its identifying data. This line sharing continues until each base unit in the system has had the opportunity to share its information with each one of the other base units on the line. Once a base unit transmits in a specific communications time slot, it continues to use this time slot for all subsequent communications in the system.

In configuring the system, the first or controlling base unit waits for an additional period before transmitting the start pulse and its identifying data for each subsequent polling cycle. This period is equal to the time for a communications time slot which occurs after the last known base unit in the system has transmitted its identifying data. Once this period has expired the controlling base unit again transmits the start pulse and any additional identifying data. All base units continue to share information or acknowledge that the data stored in the other base units is correct. When all information is shared and acknowledged as correct, the base units are configured and ready to operate in the system.

Once a handset unit associated with a base unit in the system goes off-hook in the reception range of any of the base units, each base unit receiving the signal for the request-for-service above a predetermined signal strength level will attempt to respond to the handset unit. Contention between these base units is resolved by having their responses occur randomly so that the handset unit would be unlikely to receive two or more overlapping responses generated at the same time.

When a handset unit is off-hook with a base unit, this status is communicated over the tip/ring line to the other base units in the system by the base unit then engaged with the handset unit. Thus each base unit in the system, not already communicating with another handset unit, will periodically cycle to and monitor the channel then being used by each base unit/handset unit combination and determine the radio link quality of each of these communications links. This radio link quality is provided by each idle base unit in its communications time slot to the base unit then engaged with the handset unit so that should a hand-off of the handset unit becomes necessary, the base unit then communicating with the handset unit has available the status of the other base units, including their radio link quality. If the radio link quality between an in-use handset unit and the base unit then engaged with this handset unit degrades to an unacceptable level, this base unit then identifies an idle base unit in the system which has an acceptable radio link quality and signals this idle base unit with the stronger signal to go off-hook on the channel containing the existing radio link for communicating with the handset unit. The idle base unit switches to this channel and then goes off-hook for communicating with the handset unit while the base unit then engaged with the handset unit goes on-hook.

In the second embodiment of the invention, multiple handset units may go off-hook in the same manner as multiple handset units are described, herein before, as being able to go off-hook in the first embodiment of the invention. Similarly, a broadcast ring indication signal in this second embodiment of the invention is generated by each base unit when an incoming call is received in a manner such that each base unit's associated handset unit is signaled quickly and at the same time.

Other modifications of this invention are contemplated and may obviously be resorted to by those skilled in the art. An alternative implementation of the invention that is contemplated, for example, is the use of a separate free-standing control unit connected to each of the plurality of base units through the tip/ring line for switching the telephone service for each handset unit between the plurality of base units. Like the control unit 120 in the base unit 12 shown in FIG. 3, this free-standing control unit interfaces with the control units in each of the base units operating in the system, thereby controlling the selection of both an ID-code and a frequency channel by each of these base units. The free-standing control unit also is arranged to receive and store the radio link quality provided to it by each base unit monitoring a signal from a handset unit operating in the system. And when a handset unit should be handed-off to an idle base unit, the free-standing control unit makes this determination as well as selects the idle base unit which will receive the radio link for the handset unit. It is therefore to be understood that within the scope of the appended claims, the invention may be practiced otherwise than as specifically described herein.

We claim:

1. A cordless telephone system comprising:
    at least one handset unit;
    at least two base units for communicating with the handset unit over a communication channel, the base units being dispersible so as to divide a location of the telephone system into reception areas for telephone service with the handset unit;
    means for commonly connecting the base units to a telephone line for communicating with a telephone line switching system; and
    control means for determining when said handset unit is within reception range of at least one of the base units, said control means being operable in conjunction with the base units for receiving information data for each handset unit from each of the base units for switching the telephone service for the handset unit between the base units, the control means including communication means for both receiving said information data from each base unit and providing control switching signals for each base unit over a channel imposed on the telephone line above an audio frequency band used in the telephone line for telephone service, the audio frequency band containing voice signals that are provided between the base units and the telephone line switching system.

2. The cordless telephone system of claim 1 wherein the control means is associated with each one of the base units.

3. The cordless telephone system of claim 1 wherein the control means is associated with a predetermined one of the base units.

4. The cordless telephone system of claim 1 wherein the control means comprises a control unit connected to each of the base units through the telephone line.

5. The cordless telephone system of claim 1 wherein the communication means receives said information data from each base unit and provides control switching signals for each base unit through a time division multiple access arrangement over said channel.

6. The cordless telephone system of claim 1 wherein the telephone line is a telephone wire pair.

7. In a cordless telephone system including at least one handset unit and at least two base units for communicating with the handset unit, the base units being commonly connected to a telephone line and dispersible so as to divide a location of the telephone system into reception areas for providing telephone service with the handset unit over the telephone line, at least one of the base units comprising:
    means for communicating with the handset unit over a radio frequency channel; and
    control means for determining when said handset unit is within reception range of at least one of the base units, said control means being operable in conjunction with the base units for receiving information data for each handset unit from each of the base units for switching the telephone service for the handset unit between the base units, the control means including communication means for both receiving said information data from each base unit and providing control switching signals for each base unit over a channel imposed on the telephone line above an audio frequency band used in the telephone line for telephone service, the audio frequency band containing voice signals that are provided between the base units and the telephone line switching system.

8. The cordless telephone system of claim 7 wherein the control means is associated with each one of the base units.

9. The cordless telephone system of claim 7 wherein the control means is associated with a predetermined one of the base units.

10. The cordless telephone system of claim 7 wherein the control means comprises a control unit connected to each of the base units through the telephone line.

11. The cordless telephone system of claim 7 wherein the communication means receives said information data from each base unit and provides control switching signals for each base unit through a time division multiple access arrangement over said channel.

12. The cordless telephone system of claim 7 wherein the telephone line is a telephone wire pair.

13. A cordless telephone system including a plurality of handset units and a plurality of base units for communicating over a radio frequency channel with each one of the handset units, the telephone system comprising:

means for commonly connecting the plurality of base units to a telephone line, the base units being dispersible so as to divide a location of the telephone system into a number of reception areas for providing telephone service with the handset units; and control means for determining when each handset unit is within reception range of at least one of the plurality of base units, said control means being operable in conjunction with the plurality of base units for receiving information data for each handset unit from each of the plurality of base units for switching the telephone service for each handset unit among the plurality of base units, the control means including communication means for both receiving said information data from each base unit and providing control switching signals for each base unit over a channel imposed on the telephone line above an audio frequency band used in the telephone line for telephone service, the audio frequency band containing voice signals that are provided between the base units and the telephone line switching system.

14. The cordless telephone system of claim 13 wherein each one of the plurality of base units includes means for selecting a specific one of the plurality of radio frequency channels for providing telephone service for each of the plurality of handset units.

15. The cordless telephone system of claim 13 wherein each base unit includes means for monitoring each radio frequency channel selected by each one of the plurality of base units for receipt of a request-for-service signal from any one of the plurality of handset units.

16. The cordless telephone system of claim 15 wherein responsive to the monitoring means, the plurality of base units in the system provides telephone service simultaneously for each one of the plurality of handset units in the system requesting service upon receipt of the request-for-service signal from these handset units.

17. The cordless telephone system of claim 13 wherein each base unit includes means for monitoring each radio frequency channel selected by each one of the plurality of base units, in response to the monitoring means, the base units providing telephone service to each one of the plurality of handset units during movement of the handset unit from a first reception area for a first one of the plurality of base units to a second reception area for a second one of the plurality of base units essentially without interruption over the selected communication channel.

18. The cordless telephone system of claim 17 wherein the control means includes means for controlling the selection of the identification code for use by a handset unit and for selection of the specific communication channel for use by this handset unit, the control means preventing the same identification code and communication channel from being assigned to more than one of the plurality of handset units.

19. The cordless telephone system of claim 13 wherein the communication means receives said information data from each base unit and provides control switching signals for each base unit through a time division multiple access arrangement over said channel.

20. The cordless telephone system of claim 13 wherein the telephone line is a telephone wire pair.

21. A method of extending the operating range of a cordless telephone having a plurality of handset units and a plurality of base units for communicating with the handset units over a communication channel, the base units being dispersible so as to divide a location of the telephone system into a number of reception areas for providing telephone service with the handset units, the method comprising the steps of:

commonly connecting the plurality of base units to a telephone line for communicating with a telephone line switching system; and receiving information data for each handset unit from each of the plurality of base units, said information data from the plurality of base units being received over the telephone line;

determining when each handset unit is within reception range of at least one of the plurality of base units;

providing control switching signals to each one of the plurality of base units, the control switching signals switching the telephone service for each handset unit among the plurality of base units; and providing over a channel imposed on the telephone line above an audio frequency band of the telephone line both the information data received from each base unit and the control switching signals provided to each base unit, the audio frequency band containing voice signals that are provided between the base units and the telephone line switching system.

22. The method of claim 21 wherein the providing step further includes the step of providing the control switching signals at each one of the plurality of base units.

23. The method of claim 21 wherein the providing step further includes the step of providing the control switching signals at a predetermined one of the plurality of base units.

24. The method of claim 21 wherein the providing step further includes the step of providing the control switching signals at a control unit connected to each of the plurality of base units through the telephone line.

25. The method of claim 21 further comprising the step of arranging the plurality of base units and the plurality of handset units to respectively communicate over any one of a plurality of communication channels.

26. The method of claim 25 further comprising the step of selecting a specific one of the plurality of communication channels by each one of the plurality of base units for providing telephone service for each of the plurality of handset units.

27. The method of claim 26 further comprising the step of monitoring each communication channel selected by each one of the plurality of base units for receipt of a request-for-service signal from any one of the plurality of handset units.

28. The method of claim 26 further comprising the steps of monitoring each communication channel selected by each one of the plurality of base units, and providing telephone service to one of the plurality of handset units during movement of the handset unit from a first reception area for a first one of the plurality of base units to a second reception area for a second one of the plurality of base units essentially without interruption over the selected communication channel.

29. The method of claim 21 further including the step of providing a time division multiple access arrangement for providing communications within said channel.

30. The method of claim 21 wherein the telephone line is a telephone wire pair.

* * * * *